US009163937B2

(12) United States Patent
Da et al.

(10) Patent No.: US 9,163,937 B2
(45) Date of Patent: Oct. 20, 2015

(54) THREE-DIMENSIONAL MEASUREMENT METHOD BASED ON WAVELET TRANSFORM

(75) Inventors: Feipeng Da, Jiangsu (CN); Hao Huang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 606 days.

(21) Appl. No.: 13/517,226

(22) PCT Filed: Mar. 2, 2011

(86) PCT No.: PCT/CN2011/071441
§ 371 (c)(1),
(2), (4) Date: Jun. 19, 2012

(87) PCT Pub. No.: WO2012/071817
PCT Pub. Date: Jun. 7, 2012

(65) Prior Publication Data
US 2012/0278036 A1 Nov. 1, 2012

(30) Foreign Application Priority Data

Nov. 30, 2010 (CN) .......................... 2010 1 0565765

(51) Int. Cl.
*G01B 11/25* (2006.01)
(52) U.S. Cl.
CPC ...................................... *G01B 11/25* (2013.01)

(58) Field of Classification Search
CPC ...................................................... G01B 11/25
USPC ........................................................ 702/167
See application file for complete search history.

(56) References Cited

U.S. PATENT DOCUMENTS 5,953,448 A * 9/1999 Liang ............................ 382/154

FOREIGN PATENT DOCUMENTS

| CN | 1758020 A | 4/2006 |
| CN | 101074869 A | 11/2007 |
| CN | 101666631 A | 3/2010 |
| CN | 101806587 A | 8/2010 |
| CN | 101825443 A | 9/2010 |

* cited by examiner

*Primary Examiner* — Toan Le
*Assistant Examiner* — Manuel Rivera Vargas
(74) *Attorney, Agent, or Firm* — Christensen Fonder P.A.

(57) ABSTRACT

A new three-dimensional measurement method based on wavelet transform to solve the phase distribution of a fringe pattern accurately and obtain three-dimensional profile information of a measured object from phase distribution. The method includes: projecting a monochrome sinusoidal fringe pattern onto the object; performing wavelet transform for the deformed fringe pattern acquired with CCD line by line, solving the relative phase distribution by detecting the wavelet ridge line, recording the wavelet transform scale factors at the line, and creating a quality map; dividing the relative phase distribution into two parts according to the map, and performing direct-phase unwrapping for the part with better reliability using a scan line based algorithm, and unwrapping the part with lower reliability using a flood algorithm under the guide of the quality map, to obtain the absolute phase distribution of the fringe pattern; obtaining the three dimensional information using a phase-height conversion.

1 Claim, 9 Drawing Sheets

THREE-DIMENSIONAL MEASUREMENT METHOD BASED ON WAVELET TRANSFORM

PRIORITY CLAIM

The present application is a National Phase entry of PCT Application No. PCT/CN2011/071441, filed Mar. 2, 2011, which claims priority from Chinese Application 201010565765.1, filed Nov. 30, 2010, the disclosures of which are hereby incorporated by reference herein in their entirety.

FIELD OF THE INVENTION

The present invention pertains to the field of three dimensional information reconstruction. Particularly, the present invention relates to a process for obtaining an accurate absolute phase by analyzing a deformed fringe pattern with a wavelet transform method to obtain the relative phase and creating a quality map to guide phase unwrapping, on the basis of monochrome sinusoidal grating projection.

BACKGROUND OF THE INVENTION

Three-dimensional measurement techniques are widely used in product testing and process control, medical treatment, protection of historical relics, aviation and aerospace, and cultural domains, because they can describe three-dimensional characteristics of objects and obtain three dimensional information of object surfaces.

The optical grating projection method is an important three-dimensional measuring technique which includes height information of an object in the gratings in the form of phase by projecting sinusoidal grating onto the surface of the object, utilizes CCD to obtain the grating fringe pattern of the object surface, and employs a specific algorithm to process the fringe pattern to extract the phase, so as to establish three dimensional information of the object. Commonly-used methods for solving the phase of a fringe pattern include phase-shift method, Fourier transform method, windowed Fourier transform method, and wavelet transform method, etc.

The Fourier transform method is widely used, since it can accomplish phase measurement by acquiring only one fringe pattern and thus can achieve dynamic measurement. However, Fourier transform is a global signal analysis tool. It can't extract local signal characteristics and has spectrum aliasing problems during transformation, which may influence the accuracy of phase measurement. In recent years, with rapid development of the wavelet analysis theory, wavelet transform was introduced into the domain of three-dimensional optical measurement. A technique has been developed to analyze fringe patterns by means of wavelet transform and thereby achieve three-dimensional measurement of objects, and the technique is referred to as wavelet transform profilometry. Wavelet analysis is an effective tool for analyzing non-stable signals. Compared to the conventional Fourier transform that has been widely used in the signal processing domain, wavelet transform has an advantage in the analysis of local signal characteristics. Due to the characteristic of multi-resolution analysis, a wavelet transform can not only obtain global signal characteristics like a Fourier transform, but also analyze details of local signals, and therefore has better time/spatial locality. Therefore, solving the phase of a fringe pattern by means of wavelet transform can avoid the spectrum-aliasing problem emerged in Fourier transform and achieve higher measurement accuracy.

As the phase value solved by means of wavelet transform is always within the range of $0$-$2\pi$, a phase unwrapping procedure is required. To achieve dynamic measurement, usually no secondary pattern is added to increase information and help phase unwrapping. Though the simple scan-line phase-unwrapping method has a high speed of calculation, it doesn't have enough robustness and is prone to error propagation. The quality map guided phase-unwrapping algorithm chooses a best-phase unwrapping path by creating a quality map that reflects the reliability of each pixel point of the fringe pattern. This method has higher robustness and can accomplish phase unwrapping more accurately, but it has a longer operation time and therefore is not suitable for real-time measurement.

A key procedure for the quality map guided phase unwrapping algorithm is the creation of a quality map. A quality map can be created mainly with the following methods. Phase gradient method: the maximum phase gradient between a point and its neighboring points is taken as the quality value of the point. The higher the quality value, the poorer the quality of the point. Surface vector quality map method: the inner product of a normal vector at each point and a negative unit vector in the CCD projection direction is taken as the quality value of the point, wherein, the normal vector can be calculated from the phase values of the point and its neighboring points. Neither of the above two methods involves wavelet transform parameters, and therefore are not applicable to wavelet transform profilometry. Wavelet transform ridge amplitude method: a quality map is created with the modulus at a wavelet transform ridge to guide initial phase unwrapping, under the principle that the modulus at the wavelet transform ridge represents the similarity degree between local signal and wavelet function. This method takes full advantage of the matrix obtained from wavelet transform, but such a quality map creation method doesn't take account of the scale factor at the wavelet transform ridge, which is to say, when the scale factor at the wavelet transform ridge becomes too high or too low, the modulus can't accurately reflect the quality of the local signal; in addition, as the amplitude of a local signal varies, the amplitude at the wavelet ridge in the wavelet transform matrix will vary, therefore the amplitude can't be accurately described with regard to the sinusoidal characteristic and reliability of the local signal.

SUMMARY OF THE INVENTION

Technical Challenge in view of the problems related to accuracy and real-time performance of phase unwrapping in wavelet transform profilometry, the object of the present invention is to provide a method for improving the phase unwrapping speed in wavelet transform and improving the accuracy in absolute phase solving. A method of the present invention takes full advantage of the useful information in a wavelet transform matrix, incorporates the high speed of a direct phase unwrapping method and the high accuracy of flood phase unwrapping method, can acquire the three dimensional information of the surface of a complex object from a single projected fringe pattern, and has higher accuracy and higher real-time performance.

Technical Scheme a three-dimensional measurement method based on wavelet transform, comprising the following steps:

Step 1: projecting a monochrome fringe pattern onto the surface of the object to be measured, taking a picture of the surface of the object to be measured with CCD, to obtain a deformed fringe pattern g(x,y) with height c and width r:

$$g(x,y)=A(x,y)+B(x,y)\cos[2\pi f_0 x+\phi(x,y)]$$

wherein, A(x,y) is the background light intensity distribution, B(x,y) is the reflectivity of the object surface, $f_0$ is the frequency of the sinusoidal fringes, $\phi(x,y)$ is the relative phase distribution to be solved, and (x,y) represents the two-dimensional coordinates of the deformed fringe pattern;

Step 2: performing wavelet transform for the deformed fringe pattern line by line to obtain a relative phase distribution map of the deformed fringe pattern, through the following steps:

Step 2.1: treating y as a constant, and processing line y of the deformed fringe pattern g(x,y) by means of one-dimensional continuous wavelet transform, as follows:

$$W(a_1,b)=\int_{-\infty}^{+\infty} g(x,y)M^*_{a,b}(x)dx,$$

wherein, a is a scale factor, which value is in the range of 10-50, and is taken at an interval of 0.2; b is a shift factor, which value is in the range of 1 to the width r of the fringe pattern, and is taken at an interval of 1, in unit of pixel; W ($a_1$,b) is a two-dimensional complex matrix with 200 lines and r columns; $a_1$ is the line label of the elements in matrix W($a_1$,b), which is referred to as the wavelet transform matrix of line y, $$M_{a,b}(x) = \frac{1}{\sqrt{a}} M\left(\frac{x-b}{a}\right),$$

$M^*_{a,b}(x)$ is a conjugate function of $M_{a,b}(x)$, and M(x) is the wavelet function, the expression is as follows:

$$M(x) = \frac{1}{(f_b^2 \pi)^{1/4}} \exp(2\pi i f_c x)\exp\left(\frac{-x^2}{2f_b^2}\right)$$

wherein, $f_b$ is the bandwidth of the wavelet function, $f_c$ is the center frequency of the wavelet function, and i is the complex unit, Step 2.2: obtaining the optimal scale factor distribution map $a_r(x,y)$ and relative phase distribution map $\phi(x,y)$ of the fringe pattern, wherein, the method for obtaining the values of $a_r(x,y)$ and $\phi(x,y)$ at coordinates (x,y) is as follows:

Calculating the modular matrix A($a_1$,b) and angular matrix $\phi(a_1,b)$ corresponding to W($a_1$,b) searching for the maximum element in column x of matrix A($a_1$,b), and calculating the line label $a_{max}$ of the element in matrix A($a_1$,b); then, $a_{rx}=10+0.2\times a_{max}$, where, $a_{rx}$ is the value of the optimal scale factor distribution map $a_r(x,y)$ of the fringe pattern at coordinates (x,y), the value of the element with line label $a_{max}$ in column x in matrix $\phi(a,b)$ is the value of the relative phase distribution map $\phi(x,y)$ of the fringe pattern at coordinates (x,y), Traversing all coordinate points of the fringe pattern, to obtain the optimal scale factor distribution map $a_r(x,y)$ and relative phase distribution map $\phi(x,y)$ of the fringe pattern, Step 3: creating a quality map Q(x,y), Step 3.1: performing wavelet transform for the one-dimension sinusoidal signals at frequency $f_0$:

$$W_1(a_1,b)=\int_{-\infty}^{+\infty} \cos(2\pi f_0 x)M^*_{a,b}(x)dx$$

calculating the modular matrix $A_1(a_1,b)$ of the two-dimensional complex matrix $W_1(a_1,b)$, searching for the maximum element in each column, recording the line label of the element, calculating the average value $\bar{a}$ of these row labels, and calculating the optimal scale factor $a_{r1}$:

$$a_{r1}=10+0.2\times\bar{a}$$

Step 3.2: calculating the quality map Q(x,y):

$$Q(x,y)=|a_r(x,y)-a_{r1}|$$

Step 4: dividing the relative phase distribution map $\phi(x,y)$ into two parts, according to the quality map Q(x,y), Step 4.1: creating a matrix d with value=0 in height c and width r, Step 4.2: traversing all points in the quality map Q(x,y), and calculating the value of element $Q_1$ that appears most frequently in the quality map Q(x,y), to obtain a threshold $T=1.05\times Q_1$, Step 4.3: traversing all points in the quality map Q(x,y), and setting the corresponding element in the matrix d to 1 when the value in Q(x,y) is greater than the threshold T, Step 5: unwrapping the phase at the points in the relative phase distribution map $\phi(x,y)$ where the corresponding element in matrix d is equal to 0, Step 5.1: creating a matrix S with value=0 in height c and width r, Step 5.2: choosing a point, where the corresponding element in matrix d is 0, within the range of 20×20 around the center pixels of the relative phase distribution map $\phi(x,y)$ as the start point for unwrapping, taking the absolute phase value of the start point as the value of the point in the relative phase distribution map $\phi(x,y)$, unwrapping the phases of the points towards both sides in line direction where the value of corresponding element in matrix D is 0, and, whenever a pixel point is unwrapped, setting the value of element in matrix S corresponding to the pixel point to 1; in the direct unwrapping process, if a point is encountered where its previous point in the same line has not been processed yet, taking the neighboring points in the previous line or next line as the previous point and unwrapping the point; repeating the process for each line, wherein, at each point, the specific unwrapping process is as follows:

$$\varphi_{unwrp} = \varphi_{wrp} + 2\pi\square\text{round}\left(\frac{\varphi_{unwrp1} - \varphi_{wrp}}{2\pi}\right)$$

where, $\phi_{unwrp1}$ is the absolute phase value of the previous point, $\phi_{wrp}$ is the relative phase value of the current point, $\phi_{unwrp}$ is the obtained absolute phase value of the current point, and round is an integral function, Step 6: unwrapping the phase of the points in the relative phase distribution map $\phi(x,y)$ where the corresponding element in matrix S is 0, Step 6.1: marking connected domain which value is 0 in matrix S, and treating each connected domain as follows:

Step 6.2: choosing any boundary point of the connected domain as the start point, and entering a currently empty stack, Step 6.3: searching for a point in the points neighboring the start point where the corresponding element in matrix S is 0; jumping to step 6.5 if no such a point is found in the neighboring points; for each of the found points, unwrapping the phase of the point, setting the corresponding element value in matrix S to 1, and storing the point(s) in the stack, Step 6.4: sorting the points in the stack by their values at corresponding positions in the quality map Q(x,y) of the fringe pattern, wherein the point with the biggest quality value is placed at the top of the stack, Step 6.5: taking out the point at the top of the stack as the start point, and judging whether the stack is empty; terminating the unwrapping process for the connected domain if the stack is empty; otherwise jumping to step 6.3, Step 7: obtaining the absolute phase map $\phi_1(x,y)$ of the fringe pattern through step 5 and step 6, and ultimately obtaining the three-dimensional information of the measured object by means of the classic phase-to-height conversion formula for grating projection.

Beneficial Effects compared to the prior art, the present invention has the following advantages: firstly, the present invention employs a wavelet transform method to solve the relative phase of a fringe pattern, and therefore avoids the spectrum-aliasing problem when compared to the Fourier transform based three-dimensional measurement method, and can obtain a more accurate relative phase result; furthermore, the present invention can achieve dynamic measurement by means of a single projected monochrome fringe pattern when compared to the phase-shift method; secondly, the quality map creation method in the present invention takes full advantage of the information in the wavelet transform matrix; compared to other methods, the quality map created with the method of the present invention in the phase unwrapping process can provide a phase unwrapping path that is more reliable; thus, the method of the present invention can decrease the failure rate during the phase unwrapping process and obtain a more accurate absolute phase result; finally, the method of the present invention divides the relative phase map into two parts according to the quality map, and performs phase unwrapping for the two parts with different algorithms; thus, compared to the conventional flood phase unwrapping algorithm, the method of the present invention greatly reduces the operation time required for phase unwrapping and maintains high robustness at the same time. In conclusion, the method of the present invention can acquire the three-dimensional height information of the measured object very quickly and accurately, while it has high real-time performance and robustness.

EMBODIMENTS

Hereunder the embodiments of the present invention will be further described with reference to the accompanying drawings. Vc++ 6.0 for windows may be used as the programming tool to process the deformed fringe pattern obtained by CCD. In this embodiment, foam plastics is used as the object to be measured, and ultimately an accurate global absolute phase distribution map that contains three dimensional information of the object is obtained.

Figure 1:
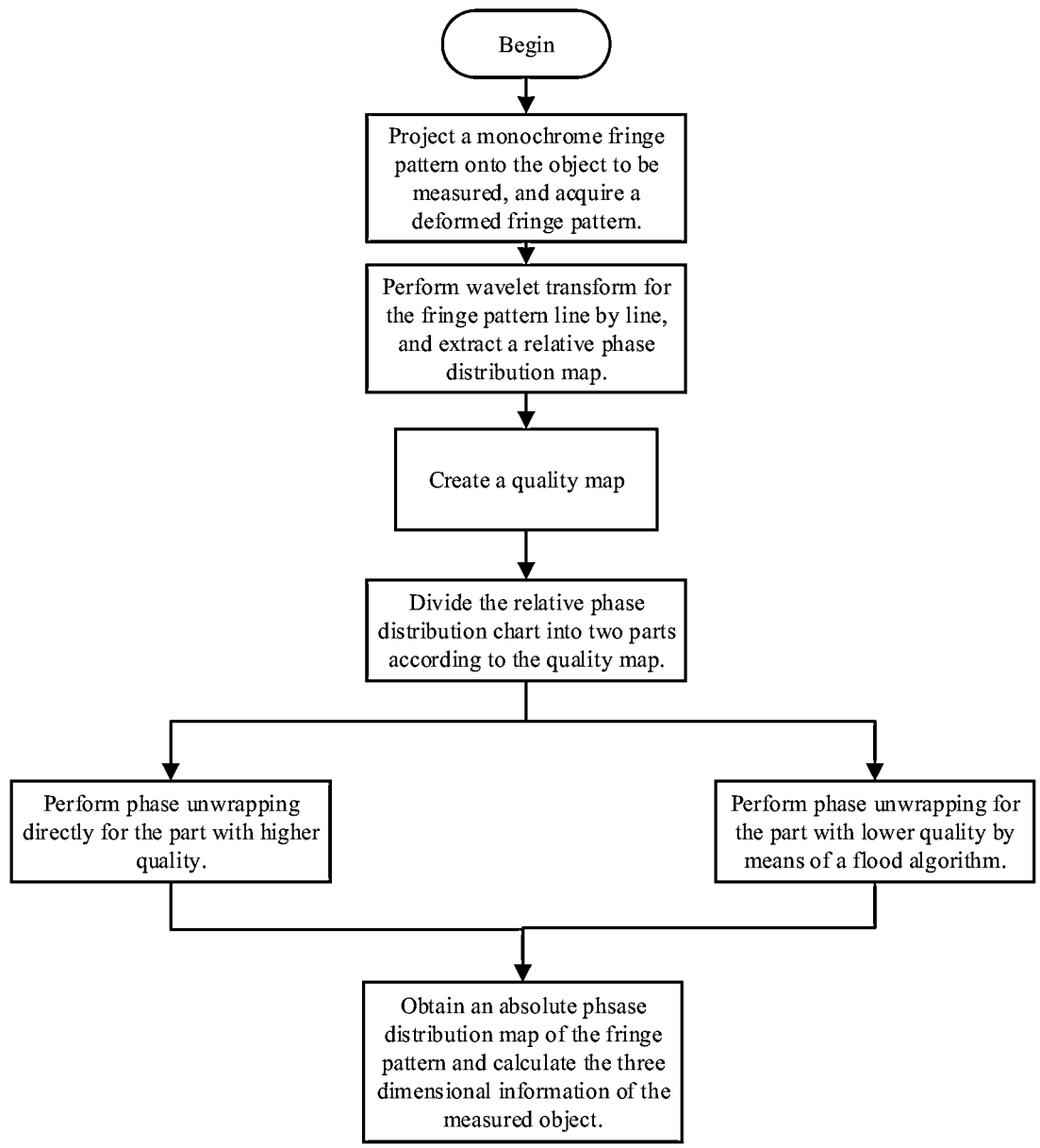
FIG. 1 is a flow chart of the entire process in the present invention.

FIG. 1 is a flow chart of the entire process in the present invention.

Figure 2:
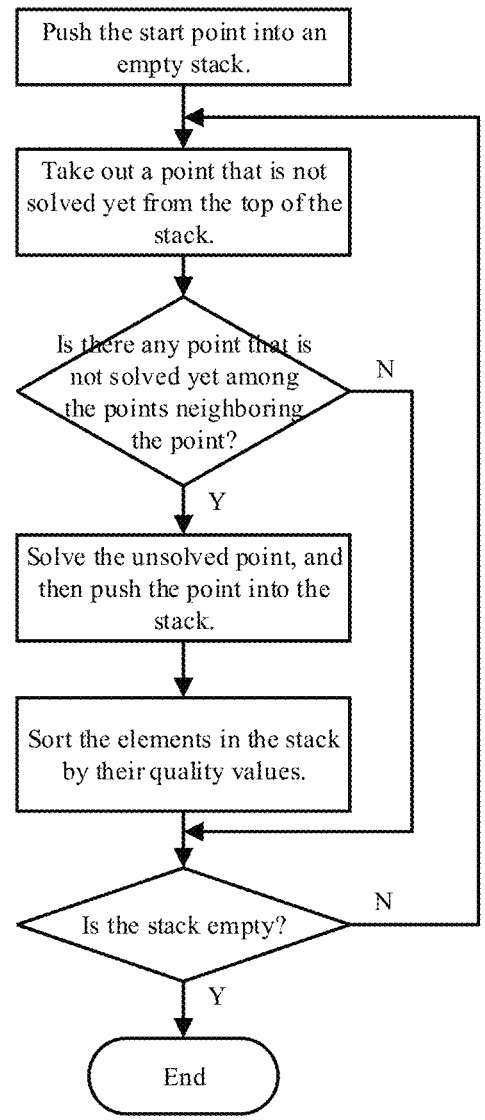
FIG. 2 is a flow chart of the specific process of phase unwrapping of points with inferior "quality" with flood algorithm in step 6.

FIG. 2 is a flow chart of the specific process of phase unwrapping of points with inferior "quality" with flood algorithm in step 6.

In view of the problem of accuracy and rapidity of wavelet transform profilometry, the method of the present invention employs wavelet transform to solve the relative phase distribution of acquired deformed fringe pattern first, and then utilizes the scale factors at the wavelet transform ridge to create a quality map to guide the quality unwrapping of a relative phase map; based on the above, to increase the speed of phase unwrapping algorithm, the method of the present invention divides the relative phase distribution into two parts by quality according to the quality map, and performs direct phase unwrapping for the part with better quality via a scan line method, while performing phase unwrapping for the part with poorer quality along the optimal path chosen under the guide of the quality map. Such a method omits some unnecessary steps in the global quality guided algorithm, and improves the efficiency of the phase unwrapping algorithm, while maintaining high measurement accuracy. After the accurate absolute phase distribution is obtained, the method utilizes the classic phase-to-height conversion formula for grating projection to obtain the three-dimensional information of the measured object ultimately.

Figure 3:
FIG. 3 shows the deformed fringe pattern of a measured object (foam plastics) acquired with CCD.

Specifically the three-dimensional measurement based on wavelet transform of the present invention is implemented through the following steps:

Step 1: project a monochrome fringe pattern onto the surface of the object to be measured, and take a picture of the object surface with CCD, to obtain a deformed fringe pattern g (x,y) with height c and width r:

$$g(x,y)=A(x,y)+B(x,y)\cos[2\pi f_0 x+\phi(x,y)]$$

wherein, A(x,y) is the background light intensity distribution, B(x,y) is the reflectivity of the object surface, since the ambient light is constant, parameters A(x,y) and B(x,y) can be treated as constants; $f_0$ is the frequency of sinusoidal fringes, and preferably $f_0$=32;

φ(x,y) is the relative phase distribution to be calculated; (x,y) represents the two-dimensional coordinates of the deformed fringe pattern; FIG. 3 shows the deformed fringe pattern, Step 2: perform wavelet transform for the deformed fringe pattern line by line, to obtain a map of relative phase distribution of the deformed fringe pattern, through the following steps:

Step 2.1: treat Y as a constant, and process line Y of the deformed fringe pattern g (x,y) by means of one-dimensional continuous wavelet transform, as follows:

$$W(a_1,b) = \int_{-\infty}^{+\infty} g(x,y) M^*_{a,b}(x) dx$$

wherein, a is a scale factor, which value is in the range of 10-50 and is taken at an interval of 0.2; b is a shift factor, which value is in the range of 1 to the width r of the fringe pattern, and is taken at an interval of 1, in unit of pixel; $W(a_1,b)$ is a two-dimensional complex matrix in 200 lines and r columns; $a_1$ is the line label of the elements in matrix $W(a_1,b)$, which is referred to as the wavelet transform matrix of line y, $$M_{a,b}(x) = \frac{1}{\sqrt{a}} M\left(\frac{x-b}{a}\right),$$

Figure 4:
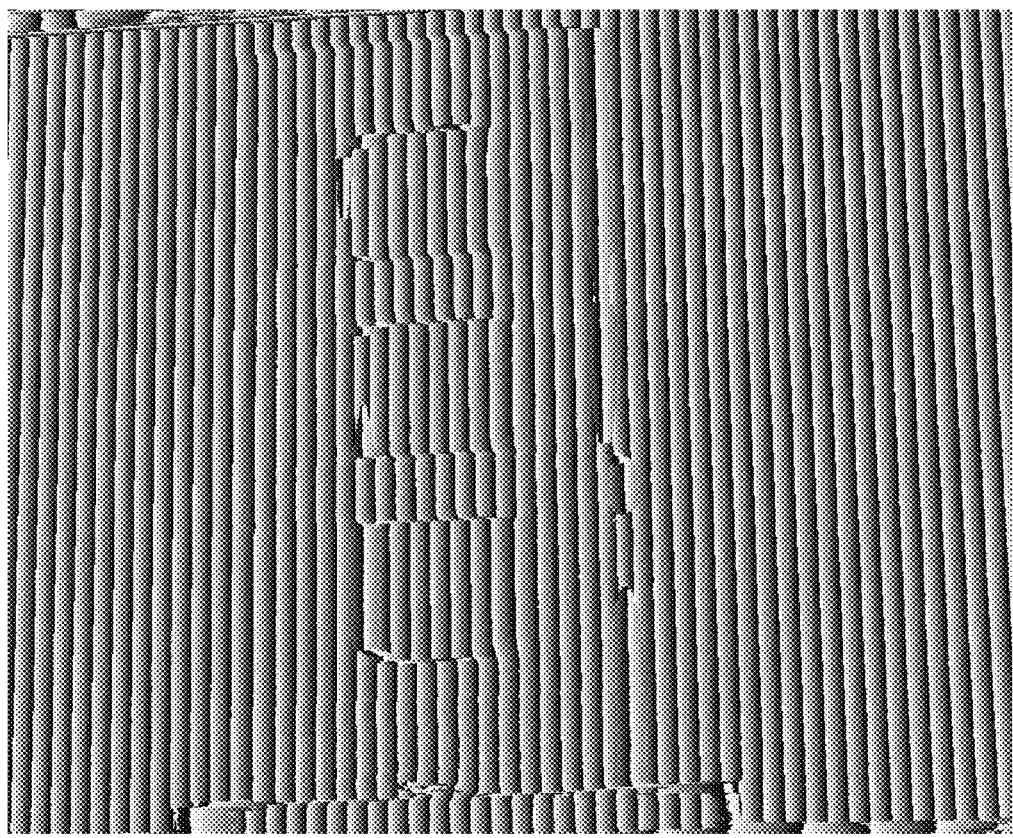
FIG. 4 shows a relative phase distribution map obtained by means of wavelet transform.
Figure 5:
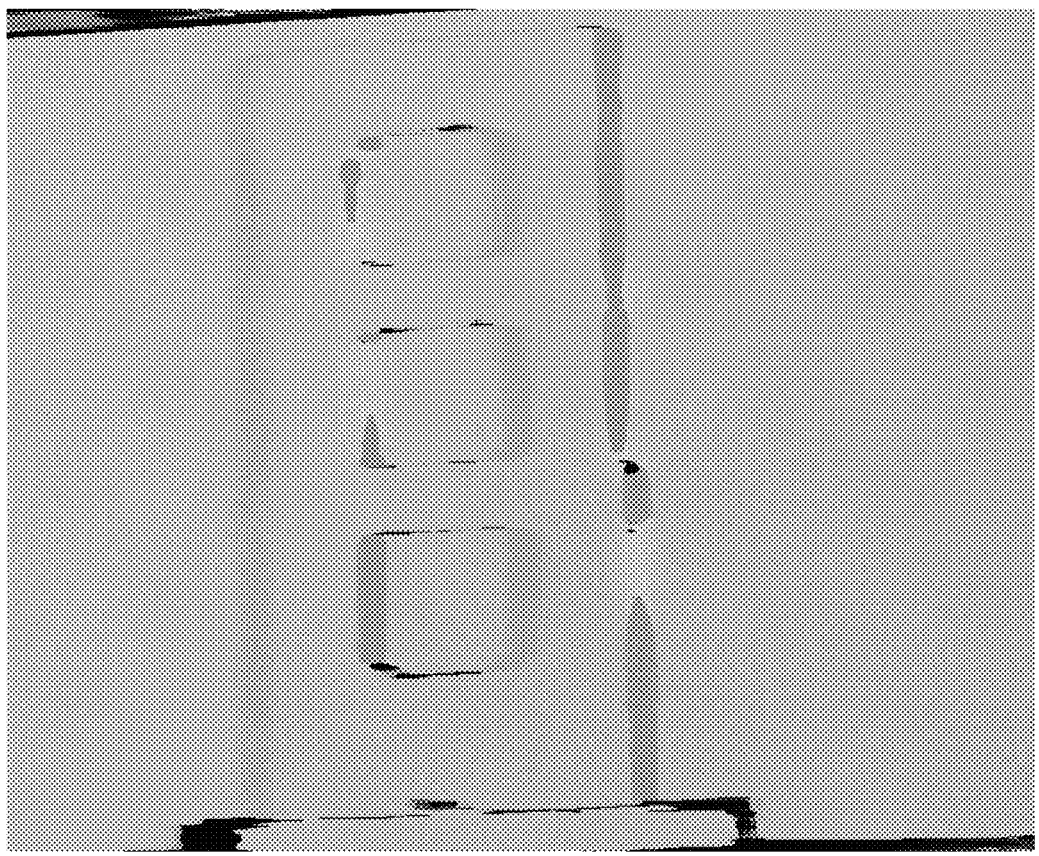
FIG. 5 shows an optimal scale-factor distribution map.

$M^*_{a,b}(x)$ is a conjugate function of $M_{a,b}(x)$, and $M(x)$ is the wavelet function; the expression is as follows:

$$M(x) = \frac{1}{(f_b^2\pi)^{1/4}} \exp(2\pi i f_c x) \exp\left(\frac{-x^2}{2f_b^2}\right)$$

wherein, $f_b$ is the bandwidth of the wavelet function, $f_c$ is the center frequency of the wavelet function, and i is the complex unit; in the present invention, $f_b=2$, $f_c=0.845$, Step 2.2: calculate the optimal scale factor distribution map $a_r(x,y)$ and relative phase distribution map φ(x,y) of the fringe pattern, wherein, the method for calculating the values of $a_r(x,y)$ and φ(x,y) at coordinates (x,y) is as follows:

calculate the modular matrix $A(a_1,b)$ and angular matrix $\varphi(a_1,b)$ corresponding to $W(a_1,b)$, $$A(a_1, b) = \sqrt{\text{imag}^2[W(a_1, b)] + \text{real}^2[W(a_1, b)]}$$

$$\varphi(a_1, b) = \arctan\frac{\text{imag}[W(a_1, b)]}{\text{real}[W(a_1, b)]}$$

search for the maximum element in column x of matrix $A(a_1,b)$, which is referred to as the wavelet transform ridge at the point with coordinates (x,y) in the fringe pattern, calculating the line label $a_{max}$ of the element in matrix $A(a_1,b)$, thus, $a_{rx}=10+0.2\times a_{max}$, this formula is actually used to search for the value of scale factor at the wavelet transform ridge according to the line label $a_{max}$; $a_{rx}$ is the value of optimal scale factor distribution map $a_r(x,y)$ of the fringe pattern at coordinates (x,y), and the value of the element with line label $a_{max}$ in row x in matrix φ(a,b) is the value of relative phase distribution map φ(x,y) of the fringe pattern at coordinates (x,y), traverse all coordinate points of the fringe pattern, to obtain the optimal scale factor distribution map $a_r(x,y)$ and relative phase distribution map φ(x,y) of the fringe pattern; the experimental result is shown in FIG. 5 and FIG. 4, respectively, Step 3: create a quality map Q(x,y), wherein, the theoretical basis for creation of a quality map is that the modulus of a wavelet transform matrix represents the similarity degree between local signals of a fringe pattern and a wavelet function; since the wavelet function selected in the present invention is a morlet function, which has a high sinusoidal characteristic, and the modulus of the wavelet transform matrix is the highest at the wavelet transform ridge, the scale factor at the wavelet transform ridge can be used to judge the sinusoidal characteristic of local signals of the fringe pattern. If the optimal scale factor at a point in the fringe pattern is too high, it indicates the local signal near the pixel point matches a low-frequency sinusoidal signal, and the area may be an area without fringe; therefore, the "quality" (i.e., reliability) of the point can be judged as low; if the optimal scale factor at the point is too low, it indicates the local signal near the pixel point matches a high-frequency sinusoidal signal, and that phenomenon may be resulted from noise interference; thus, the "quality" of that point can also be judged as low. Therefore, the first task is to find such a value that the "quality" of a pixel point is the best when the optimal scale factor at the pixel point is equal to that value; step 3.1 is right the procedure for finding such a value; step 3.2 is a procedure for creating a quality map, wherein, the quality of each point in the quality map virtually implies the "distance" between the scale factor at that point and the optimal scale factor. The quality map obtained in this step will be used in step 5 to divide the relative phase distribution map into two parts, and will be used in step 6 to guide the phase unwrapping process and to obtain the optimal path for phase unwrapping, Step 3.1: perform wavelet transform for the one-dimension sinusoidal signals at frequency $f_0$:

$$W_1(a_1,b) = \int_{-\infty}^{+\infty} \cos(2\pi f_0 x) M^*_{a,b}(x) dx$$

calculate the modular matrix $A_1(a_1,b)$ of the two-dimensional complex matrix $W_1(a_1,b)$, search for the maximum element in each line, record the line label of the element, calculate the average value $\bar{a}$ of these line labels, and calculate the optimal scale factor $a_{r1}$:

$$a_{r1} = 10 + 0.2 \times \bar{a}$$

Figure 6:
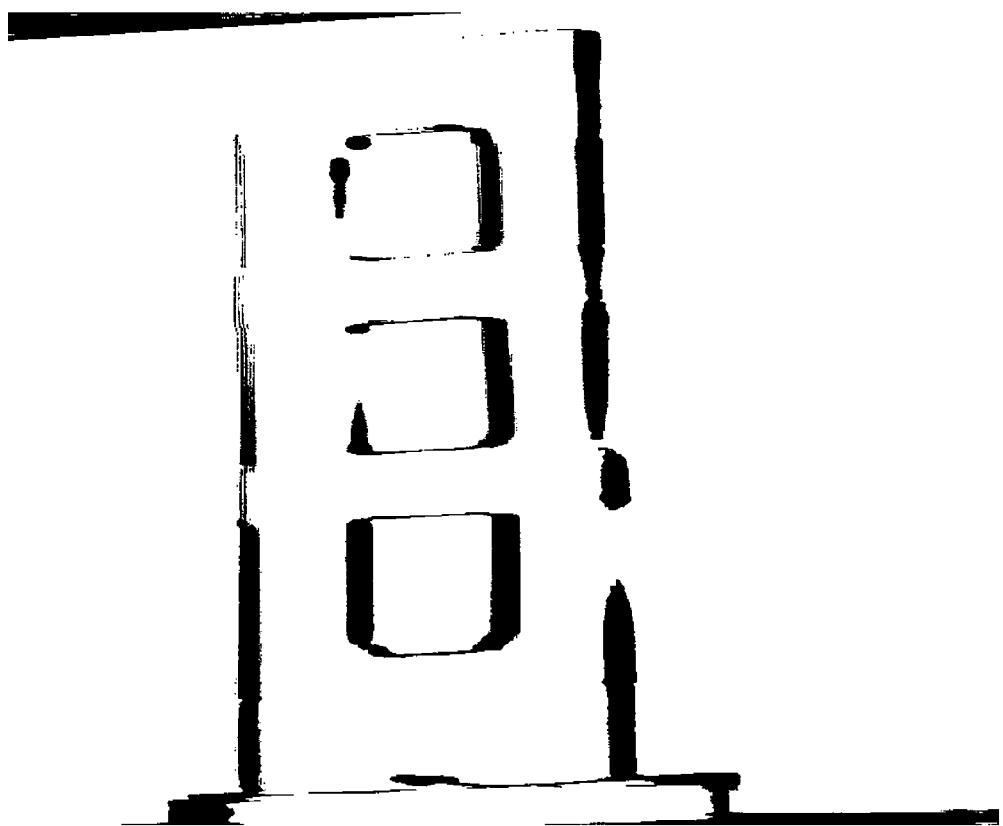
FIG. 6 shows a binary image obtained by dividing the optimal scale-factor distribution map with a threshold calculated according to the quality map.
Figure 7:
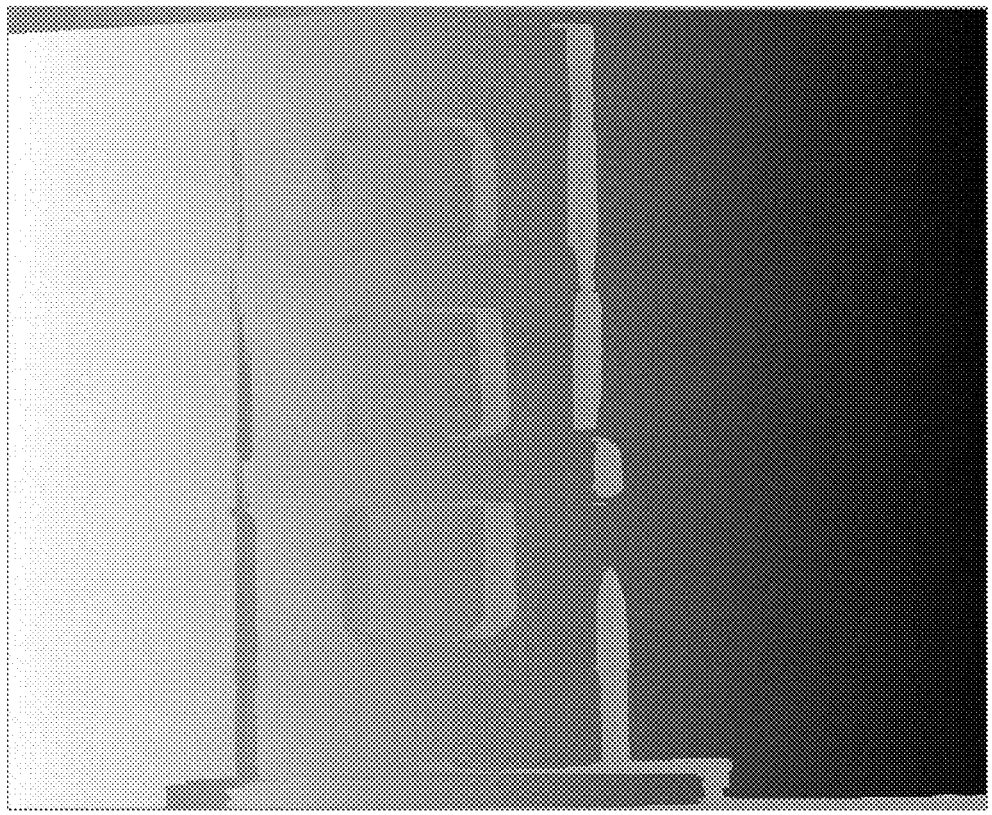
FIG. 7 shows an unwrapped phase image obtained through step 5.
Figure 8:
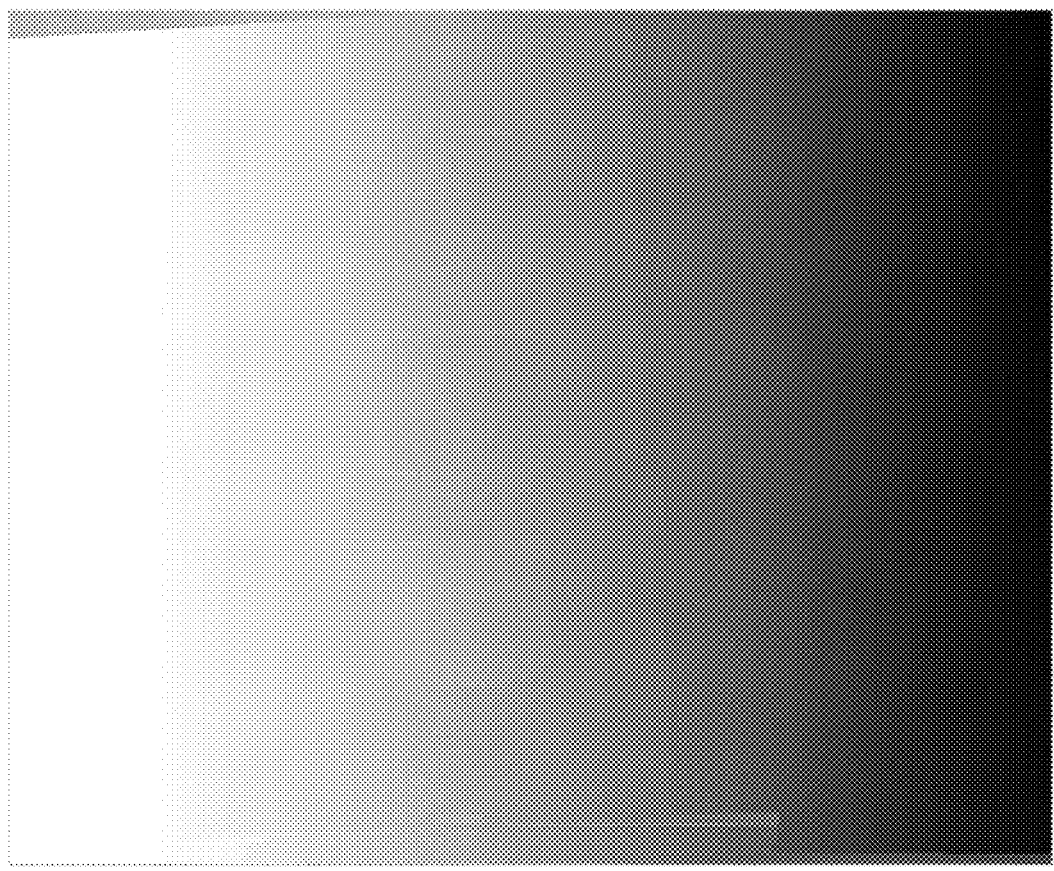
FIG. 8 shows the ultimately obtained absolute phase distribution image.
Figure 9:
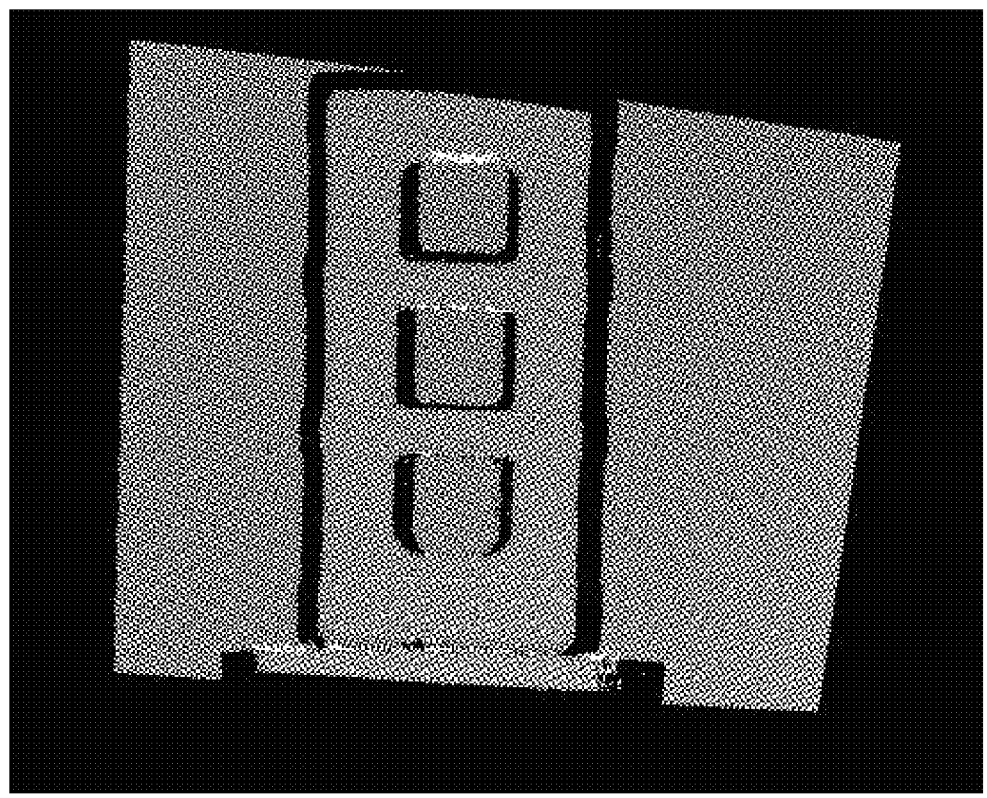
FIG. 9 shows a point cloud image that represents the three-dimensional information of the measured object, which is obtained by means of the classic phase-to-height conversion formula for grating projection.

Step 3.2: calculate the quality map Q(x,y):

$$Q(x,y) = |a_r(x,y) - a_{r1}|$$

in the quality map created in the present invention, the higher the quality value is, the lower the reliability of the pixel point will be, Step 4: divide the relative phase distribution map φ(x,y) into two parts, according to the quality map Q(x,y);

Step 4.1: create a matrix D with zero value, height c and width r, wherein the matrix D is in the same size as the fringe pattern, and is designed to differentiate the two parts of the relative phase distribution map divided according to the quality map, Step 4.2: traverse the quality map Q(x,y), and perform statistics to obtain the quality value $Q_1$ that occurs most frequently, to obtain a threshold $T=1.05\times Q_1$, Step 4.3: traverse the quality map Q(x,y), and set the corresponding element in matrix D to 1 when the value in Q(x,y) is greater than the threshold T; FIG. 6 is a graphical representation of matrix D, wherein, the white area represents points that have better quality and will be unwrapped first, while the black area is an area where the points have to be unwrapped with a flood algorithm, Step 5: unwrap the phases at points in the relative phase distribution map φ(x,y) where the corresponding element in matrix D is 0; all points unwrapped in this step are points with better "quality" and their quality values are similar; with the conventional flood phase unwrapping algorithm, these points still have to be sorted, but the phase unwrapping path has little effect on the accuracy before sorting and after sorting; therefore, for this part, an accurate result can be obtained with the simplest scan line based phase unwrapping algorithm, and the operation speed is very quick, Step 5.1: create a matrix S with zero value, height c and width r; wherein, the matrix S is in the same size as the fringe pattern, and it is used to indicate whether the points in the relative phase distribution map φ(x,y) have been unwrapped or not, Step 5.2: choose a point within the range of 20×20 around the center pixel of the relative phase distribution map φ(x,y) where the corresponding element in matrix D has a value of 0, as the start point for unwrapping, take the absolute phase value of the start point as the value of that point in the relative phase distribution map φ(x,y), unwrap the phases of the point towards both sides in line direction where the corresponding element value in matrix D is 0, and, whenever a pixel point is unwrapped, set the value of element in matrix S corresponding to the pixel point to 1; in the unwrapping process, if a point is encountered where its previous point in the same line has not been processed yet, take the point neighboring that point in the previous line or next line as the previous point and unwrapping the point; if neither of the neighboring points has been treated, leave those points to step 6; repeat the process for each line, wherein, at each point, the specific unwrapping process is as follows:

$$\varphi_{unwrp} = \varphi_{wrp} + 2\pi \Box round\left(\frac{\varphi_{unwrp1} - \varphi_{wrp}}{2\pi}\right)$$

where, $\phi_{unwrp1}$ is the absolute phase value of the previous point, $\phi_{wrp}$ is the relative phase value of the current point, $\phi_{unwrp}$ is the obtained absolute phase value of the current point, and round is an integral function; FIG. 7 shows the phase distribution map obtained through step 5, Step 6: unwrap the phase at the points in the relative phase distribution map φ(x,y) where the corresponding element in matrix S has a value of zero; the points in this part have poorer "quality; to attain high unwrapping accuracy, these points are processed with a flood phase unwrapping algorithm; the flow map of flood algorithm is shown in FIG. 2; since the number of points in this part is very small, the required operation time is short, Step 6.1: mark connected domains where the value is 0 in matrix S; a connected domain in a binary matrix refers to a set of elements that are adjacent to each other and have the same value in the binary matrix; as shown in FIG. 6, each closed black area is a connected area; for each connected area, treat as follows:

Step 6.2: choose any boundary point of the connected domain as the start point, and enter the currently empty stack, Step 6.3: search for points in the points neighboring the start point where the corresponding element in matrix S has a value of zero; jump to step 6.5 if no such a point is found in the neighboring points; for each of the points found, unwrap the phase at the point, set the corresponding element in matrix 5 to 1, and store the point in the stack, Step 6.4: sort the points in the stack by their values at corresponding positions in the quality map Q(x,y) of the fringe pattern, with the point with the highest quality value being placed at the top of the stack, Step 6.5: take out the point at the top of the stack as the start point, and judge whether the stack is empty; terminate the unwrapping process for the connected domain if the stack is empty; otherwise jump to step 6.3, Step 7: through step 5 and step 6, all points in the relative phase distribution map φ(x,y) of the fringe pattern are traversed, and an absolute phase distribution map $\phi_1$(x, y) of the fringe pattern is obtained; FIG. 8 shows an absolute phase distribution map of the measured object. Based on vc++ platform on a PC, the operation time of phase unwrapping in the present invention is 27 s; the operation time of global phase unwrapping is almost 90 min; thus, it is apparent that the method provided in the present invention has high real-time performance. The three-dimensional information of the measured object can be obtained ultimately by means of the classic phase-to-height conversion formula for grating projection. FIG. 9 shows three-dimensional information of the measured object in a point cloud representation.

The formula for conversion of absolute phase distribution map $\phi_1$(x,y) of a fringe pattern to the height of object is as follows:

$$h(x, y) = \frac{l\Delta\varphi}{\Delta\varphi - \omega_0 d}$$

wherein, l and d are geometric parameters of the measurement system, l is the distance from the projector to the measurement plane, d is the distance from the CCD camera to the projector, $\Delta\phi = \phi_1(x,y) - \phi_0(x,y)$ represents phase change amplitude, $\phi_1(x,y)$ is the phase unwrapping result, $\phi_0(x,y)$ is the initial phase result, which depends on the reference plane for measurement, and $\omega_0$ is the angular frequency of the projection gratings, which can be obtained through system calibration.

The invention claimed is:

1. A three-dimensional measurement method based on wavelet transform, comprising the following steps:

Step 1: projecting a monochrome fringe pattern onto a surface of an object to be measured, taking a picture of the object surface with a charge-coupled device (CCD), to obtain a deformed fringe pattern g(x,y) with height c and width r:

$$g(x,y) = A(x,y) + B(x,y)\cos[2\pi f_0 x + \phi(x,y)]$$

wherein, A(x,y) is a background light density distribution, B(x,y) is a reflectivity of the object surface, $f_0$ is a frequency of the sinusoidal fringes, φ(x,y) is a relative phase distribution map to be solved, and (x,y) represents two-dimensional coordinates of the deformed fringe pattern;

Step 2: performing wavelet transform for the deformed fringe pattern line by line, to obtain a map of relative phase distribution of the deformed fringe pattern, through the following steps:

Step 2.1: treating y as a constant, and processing line Y of the deformed fringe pattern g (x,y) by means of one-dimensional continuous wavelet transform, as follows:

$$W(a_1,b) = \int_{-\infty}^{+\infty} g(x,y) M_{a,b}^*(x) dx$$

where, a is a scale factor, whose value is in the range of 10-50, and is taken at an interval of 0.2; b is a shift factor, which value is in the range of 1 to the width r of the fringe pattern, and is taken at an interval of 1, in unit of pixel; W ($a_1$,b) is a two-dimensional complex matrix in 200 lines and r columns; $a_1$ is the line label of the elements in matrix W ($a_1$,b) which is referred to as the wavelet transform matrix of line y, $$M_{a,b}(x) = \frac{1}{\sqrt{a}} M\left(\frac{x-b}{a}\right),$$

$M_{a,b}^*(x)$ is a conjugate function of $M_{a,b}(x)$, M(x) is wavelet function expressed as follows:

$$M(x) = \frac{1}{(f_b^2 \pi)^{1/4}} \exp(2\pi i f_c x) \exp\left(\frac{-x^2}{2 f_b^2}\right)$$

wherein, $f_b$ is a bandwidth of the wavelet function, $f_c$ is a center frequency of the wavelet function, and i is a complex unit, Step 2.2: calculating an optimal scale factor distribution map $a_r(x,y)$ and relative phase distribution map φ(x,y) of the fringe pattern, wherein, the method for calculating values of $a_r(x,y)$ and φ(x,y) at coordinates (x,y) is as follows:

calculating the modular matrix A($a_1$,b) and angular matrix φ($a_1$,b) corresponding to W($a_1$,b) searching for the maximum element in column x of matrix A($a_1$,b), and calculating line label $a_{max}$ of an element in matrix A($a_1$,b); then, $a_{rx}=10+0.2 \times a_{max}$, where, $a_{rx}$ is a value of the optimal scale factor distribution map $a_r(x,y)$ of the fringe pattern at coordinates (x,y), a value of the element with line label $a_{max}$ in column x in matrix φ(a,b) is a value of the relative phase distribution map φ(x,y) of the fringe pattern at coordinates (x,y), traversing all coordinate points in the fringe pattern, to obtain the optimal scale factor distribution map $a_r$(x, y) and relative phase distribution map φ(x,y) of the fringe pattern, Step 3: creating a quality map Q(x,y),
Step 3.1: performing wavelet transform for a one-dimension sinusoidal signals at frequency $f_0$:

$$W_1(a_1,b) = \int_{-\infty}^{+\infty} \cos(2\pi f_0 x) M_{a,b}^*(x) dx$$

calculating modular matrix $A_1(a_1,b)$ of a two-dimensional complex matrix $W_1(a_1,b)$, searching for a maximum element in each column, recording a line label of the maximum element, calculating an average value $\bar{a}$ of these line labels, and calculating an optimal scale factor $a_{r1}$:

$$a_{r1} = 10 + 0.2 \times \bar{a}$$

Step 3.2: calculating a quality map Q(x,y):

$$Q(x,y) = |a_r(x,y) - a_{r1}|$$

Step 4: dividing the relative phase distribution map φ(x,y) into two parts, according to the quality map Q(x,y);
Step 4.1: creating a matrix D with value=0 in height c and width r,
Step 4.2: traversing all points in the quality map Q(x,y), and calculating a value of element g that appears most frequently in the quality map Q(x,y), to obtain a threshold T=1.05×$Q_1$,
Step 4.3: traversing all points in the quality map Q(x,y), and setting a corresponding element in the matrix D to 1 when the value in Q(x,y) is greater than the threshold T,
Step 5: unwrapping a phase at points in the relative phase distribution map φ(x,y) where a corresponding element in matrix D is equal to 0,
Step 5.1: creating a matrix S with value=0 in height c and width r,
Step 5.2: choosing a point within a range of 20×20 around a center pixel of the relative phase distribution map φ(x,y) where the corresponding element in matrix D is equal to 0, as a start point for unwrapping, taking an absolute phase value of a start point as a value of that point in the relative phase distribution map φ(x,y), unwrapping the phases of the points towards both sides in a line direction where the corresponding element in matrix D is equal to 0, and, whenever a pixel point is unwrapped, setting the element in matrix S corresponding to the pixel point to 1; in the unwrapping process, if a point is encountered where its previous point in a same line has not been processed yet, taking a point neighboring that point in a previous or next line as a previous point and unwrapping the point;
repeating the process for each line,
wherein, at each point, a specific unwrapping process is as follows:

$$\varphi_{unwrp} = \varphi_{wrp} + 2\pi \text{ground}\left(\frac{\varphi_{unwrp1} - \varphi_{wrp}}{2\pi}\right)$$

wherein, $\varphi_{unwrp1}$ is a solved absolute phase value of a previous point, $\varphi_{wrp}$ is the relative phase value of a current point, which is a value of the current point in the relative phase distribution map φ(x,y), $\varphi_{unwrp}$ is an obtained absolute phase value of the current point, and round is an integral function, Step 6: unwrapping the phase at points in the relative phase distribution map φ(x,y) where a corresponding element in matrix S is equal to 0,
Step 6.1: marking connected domains where elements are equal to 0 in matrix S, and treating each connected domain as follows:
Step 6.2: choosing any boundary point of a connected domain as a start point, and pushing the point into a stack that is empty at present,
Step 6.3: searching for points in a points neighboring the start point where the corresponding element in matrix S is equal to 0; jumping to step 6.5 if no such point is found in neighboring points; for each of the points found, unwrapping the phase at the point, setting the corresponding element in matrix S to 1, and storing the point in the stack,
Step 6.4: sorting the points in the stack by their values at corresponding positions in the quality map Q(x,y) of the fringe pattern, with the point with the highest quality value placed at a top of the stack, Step 6.5: taking out a point at a top of the stack as a start point, and judging whether the stack is empty; terminating the unwrapping process for the connected domain if the stack is empty; otherwise jumping to step 6.3, Step 7: obtaining the absolute phase map ϕ(x,y) of the fringe pattern through step 5 and step 6, and ultimately obtaining three dimensional information of the measured object by means of a classic phase-to-height conversion formula for grating projection and then obtaining and displaying a point cloud image that represents the three-dimensional information of the measured object.

\* \* \* \* \*